J. G. GEIWITZ.
GATE.
APPLICATION FILED JULY 15, 1915.
1,187,059.
Patented June 13, 1916.
2 SHEETS—SHEET 1.
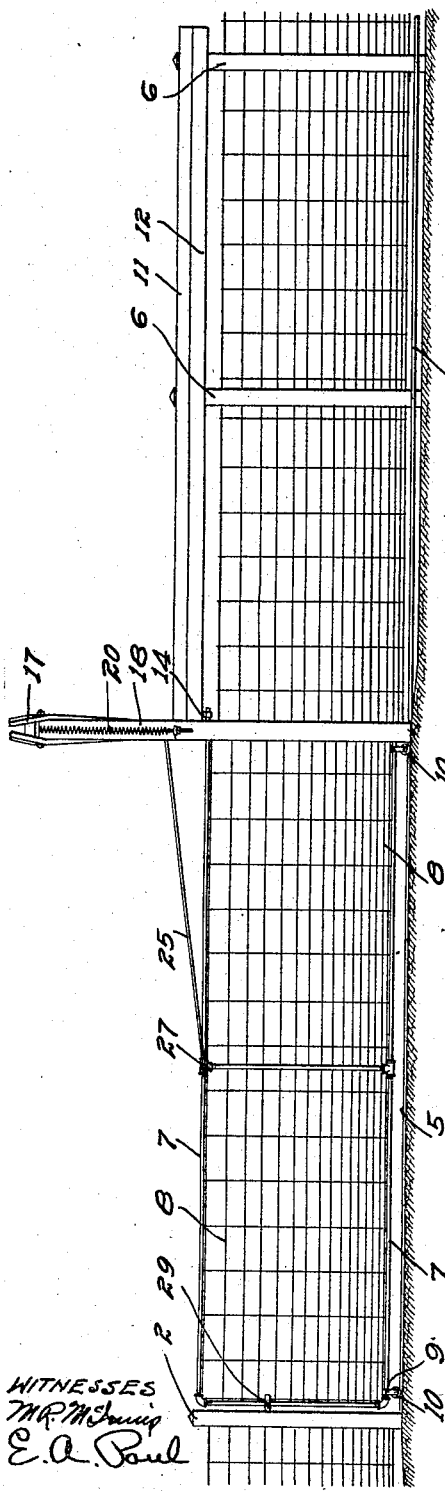
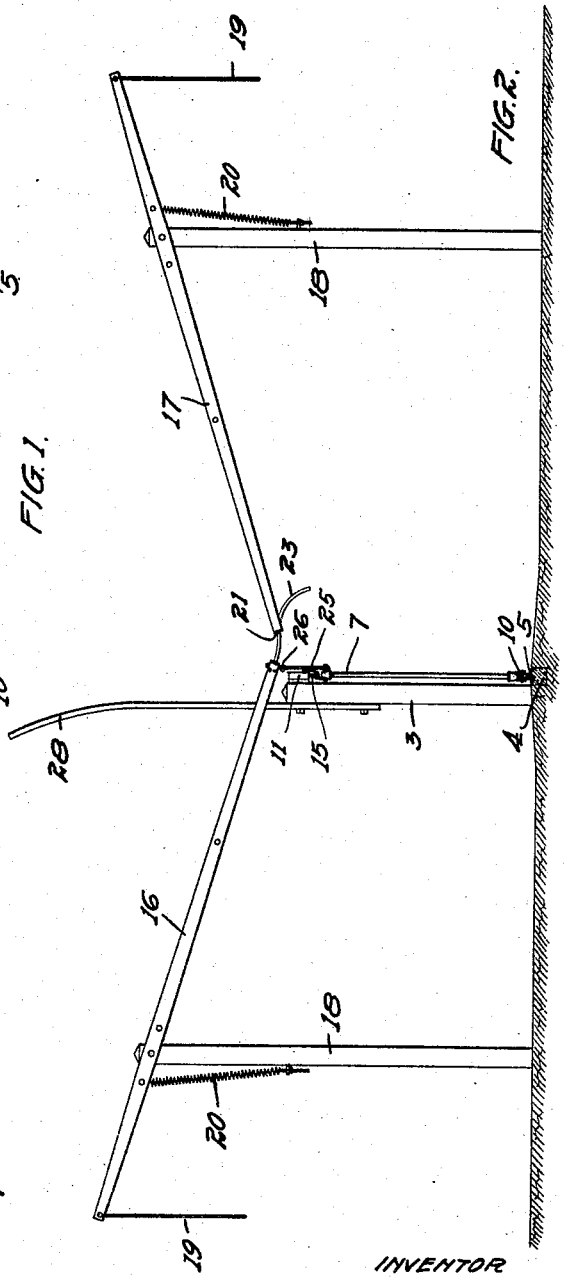
INVENTOR
JOHN G. GEIWITZ
BY
ATTORNEYS
WITNESSES

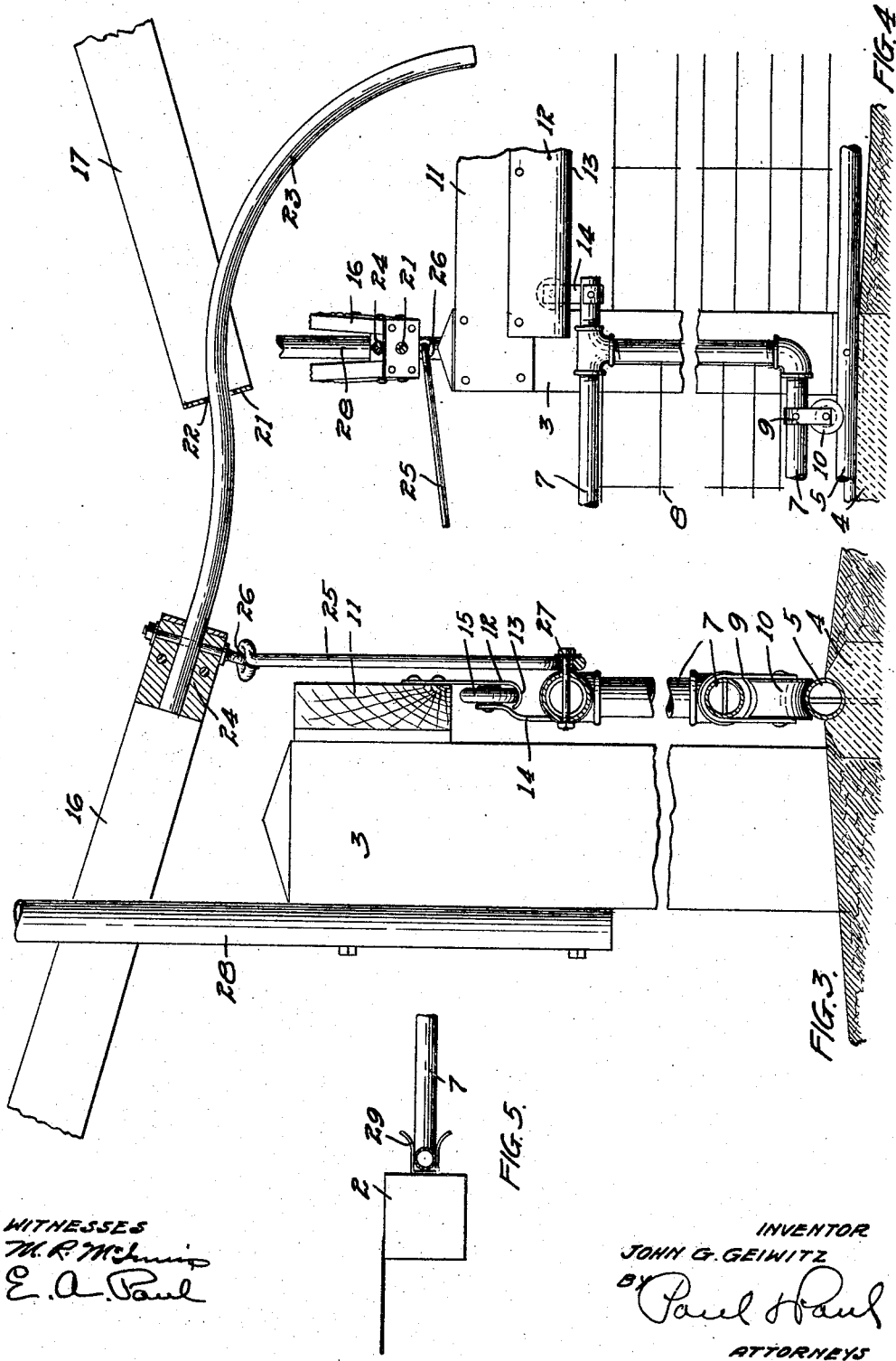

UNITED STATES PATENT OFFICE.

JOHN G. GEIWITZ, OF MINNEOTA, MINNESOTA.

GATE.

1,187,059.  Specification of Letters Patent.  Patented June 13, 1916.

Application filed July 15, 1915. Serial No. 40,056.

*To all whom it may concern:*

Be it known that I, JOHN G. GEIWITZ, a citizen of the United States, resident of Minneota, county of Lyon, State of Minnesota, have invented certain new and useful Improvements in Gates, of which the following is a specification.

The object of my invention is to provide a gate designed particularly for highways which can be opened or closed by the occupant of a vehicle without the necessity of leaving his seat.

A further object is to provide improved means for mounting or supporting the gate to the end that it can be moved easily to open or closed position.

The invention consists generally in various constructions and combinations, all as hereinafter described and particularly pointed out in the claim.

In the accompanying drawings forming part of this specification, Figure 1 is a front view of a gate and its connections, embodying my invention, Fig. 2 is an end view of the gate, illustrating the mechanism for operating it, Fig. 3 is a detail sectional view, showing the manner of mounting the gate, Fig. 4 is a detail view, showing the bearings for the gate and the connections between it and the operating means, Fig. 5 is a transverse sectional view, showing the post and the seat for the gate when in its closed position.

In the drawing, 2 and 3 represent upright posts provided on opposite sides of the gate opening.

4 is a foundation or bed, preferably of concrete, in which a guide, such as a pipe 5, is seated, forming a level, substantial support for the gate. This bed extends across the gate opening and the pipe is continued a sufficient distance to form a support for the gate when open and is carried by suitable means, such as the fence posts 6. The concrete foundation may, of course, be extended the full length of the supporting pipe, if desired. This, however, would probably involve an unnecessary expense.

The gate frame 7 is preferably made of tubing, with a suitable wire filler 8 and the lower rail is provided with depending straps 9 in which hollow faced wheels 10 are mounted and adapted to roll on the supporting guide pipe 5. I prefer to provide two of these wheels for the gate, one at each end. The top rail 11 of the fence is provided with a hanger 12 consisting preferably of sheet metal having an inwardly turned lower portion forming a track or guide 13. A hanger 14 is mounted on the top rail of the gate and provided with a wheel 15 to roll in a guide 13. This construction forms anti-friction bearings for the gate, allowing it to be moved readily back and forth to close or open the passage.

To operate the gate, I provide levers 16 and 17, pivotally supported on the upper ends of posts 18 and having their short arms provided with operating cords 19 and also preferably provided with coiled springs 20 connecting the short arms with said posts and tending to exert a lifting effect on the long arms of the levers. The lever 17 has a plate 21 thereon provided with an opening 22 to receive a rod 23 that is mounted in a support 24 in the end of the opposite lever 16. A link 25 has a swivel connection at 26 with the lever 16 and a pivotal connection at 27 with the upper rail of the gate and when either lever is operated by a pull on the short arm thereof, power will be transmitted through the link 25 to move the gate lengthwise from an open to a closed position or vice versa, the momentum of the gate being sufficient to carry the link 25 past the center. The rod 23 will serve to transmit motion from one lever to the other and will also prevent the levers from oscillating laterally during their vertical movement. A standard 28 is mounted on the post 3 for the purpose of guiding the lever 16 and I also provide a substantially U-shaped seat 29 on the post 2 to engage the end rail of the gate and hold it against lateral movement, the walls of the guide being flared slightly to engage the gate rail and direct it to the center or seat of the guide.

The gate may be made in various sizes and in various ways the details of construction may be modified and still be within the scope of my invention.

I claim as my invention:

The combination, with the posts arranged upon opposite sides of a gate opening, of a gate mounted to slide in a vertical plane between said posts and having suitable guides, lever-supporting posts mounted upon opposite sides of said gate, levers pivoted on said posts respectively and having long and short arms, springs connecting said lever-supporting posts with the short arms of said levers and normally tending to counter-balance the weight of the longer arms of said levers, the short arms of said levers also having means to be grasped in the hand for tilting said levers, the inner longer arms of said levers being opposite one another and one lever having means for a loose sliding connection with the opposite lever, said means including a rod centrally mounted at one end in one of said levers and fitting loosely within an opening that is centrally arranged in the end of the opposite lever, and a link pivotally connected at one end with the long arm of one of said levers and at its other end pivotally connected to said gate.

In witness whereof, I have hereunto set my hand this 9th day of July 1915.

JOHN G. GEIWITZ.

Witnesses:
L. M. LERWICK,
J. E. McGEIM.

Copies of this patent may be obtained for five cents each, by addressing the "Commissioner of Patents, Washington, D. C."